Patented July 25, 1944

2,354,192

UNITED STATES PATENT OFFICE 2,354,192

INSECTICIDE

Charles Verne Bowen, Bethesda, Md., assignor to the United States of America as represented by Claude R. Wickard, Secretary of Agriculture, and his successors in office No Drawing. Application September 25, 1943, Serial No. 503,829

11 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

My invention relates to improvements in materials for destroying or checking the growth or multiplication of living organisms, whether plant or animal, which are economically injurious to man.

The principal object of my invention is to provide materials suitable for use as insecticides.

A further object is to provide synthetic organic insecticides which may replace insecticide materials (such as pyrethrum, rotenone, and nicotine) that are obtained from plants, and thus to provide insecticides the production of which is not influenced by such factors as climatic variations, growing conditions, localized production, and transportation.

Other objects will appear from the following description.

I have found that certain compounds of the class consisting of 4-phenyl-3-thiosemicarbazones are toxic to insects. These compounds are represented by the general formula:

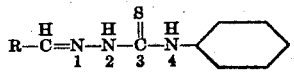

in which the group

represents the residue of an aldehyde selected from the group consisting of aryl aldehydes, aralkylene aldehydes, and aldehydes characterized by the presence of a 2-furyl group.

The effectiveness as insecticides of substituted thiosemicarbazones of this type is shown by the following experimental results:

EXAMPLE I

Benzaldehyde 4-phenyl-3-thiosemicarbazone

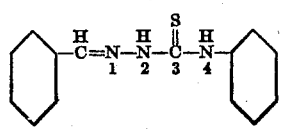

When tested as a dust against the fifth instar of the bean leaf roller, this compound gave a 63 percent kill in 72 hours.

EXAMPLE II

Salicylaldehyde 4-phenyl-3-thiosemicarbazone

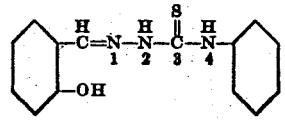

(a) When tested as a dust against the fourth instar of the Southern army worm, this compound gave a kill of 97 percent in 72 hours.

(b) When tested as a spray against the fifth instar of the Southern army worm, this compound gave a 68 percent kill in six hours.

(c) A spray at a concentration of four pounds of this compound per 100 gallons gave a 95 percent kill of newly hatched European corn borer larvae in 48 hours.

Cinnamaldehyde 4-phenyl-3-thiosemicarbazone, 2-furaldehyde 4-phenyl-3-thiosemicarbazone, and 2-furanacrolein 4-phenyl-3-thiosemicarbazone are examples of other thiosemicarbazones of this class which have shown toxicity to insects.

The compounds cited above in describing entomological results are given merely as examples and are not intended as limiting this invention.

These materials may be reduced to impalpable powders by grinding and applied to vegetation as a dust, either alone or with inert carriers, or they may be made onto suspension and used as a spray. When applied as a spray in a liquid medium, it is often desirable to incorporate certain conditioners, such as dispersing agents, wetting agents, stickers and spreaders. A spray may be made by mechanically suspending the impalpable powder in the liquid medium or by first dissolving it in an appropriate solvent, such as acetone, and then pouring the resulting solution into water, whereupon a fine colloidal suspension is obtained. This may be applied directly to the host plant or may be combined with suitable conditioners and then sprayed. Also, certain of these compounds are soluble in oil, and may consequently be applied as components of an oil emulsion spray.

For the control of certain types of insects, it may be advantageous to admix any one of this class of compounds with known insecticides, such as pyrethrum, derris, the arsenicals, phenothiazine, and so forth.

Having thus described my invention, I claim:

1. An insecticidal composition comprising, in admixture with a carrying agent, a compound represented by the formula:

$$R-\overset{H}{C}=N-\overset{H}{N}-\overset{\overset{S}{\|}}{C}-\overset{H}{N}-\langle\phantom{O}\rangle$$

in which the group of $$R-\overset{H}{C}=$$

represents the residue of an aldehyde selected from the group consisting of aryl aldehydes, aralkylene aldehydes, and aldehydes characterized by the presence of a 2-furyl group.

2. An insecticidal composition comprising benzaldehyde 4-phenyl-3-thiosemicarbazone in admixture with a carrying agent.

3. An insecticidal composition comprising salicylaldehyde 4-phenyl-3-thiosemicarbazone in admixture with a carrying agent.

4. An insecticidal composition comprising cinnamaldehyde 4-phenyl-3-thiosemicarbazone in admixture with a carrying agent.

5. The process of destroying insects which comprises dusting material liable to attack by said insects with a compound represented by the formula:

$$R-\overset{H}{C}=N-\overset{H}{N}-\overset{\overset{S}{\|}}{C}-\overset{H}{N}-\langle\phantom{O}\rangle$$

in which the group of $$R-\overset{H}{C}=$$

represents the residue of an aldehyde selected from the group consisting of aryl aldehydes, aralkylene aldehydes, and aldehydes characterized by the presence of a 2-furyl group.

6. The process of destroying insects which comprises spraying material liable to attack by said insects with a compound represented by the formula:

$$R-\overset{H}{C}=N-\overset{H}{N}-\overset{\overset{S}{\|}}{C}-\overset{H}{N}-\langle\phantom{O}\rangle$$

in which the group of $$R-\overset{H}{C}=$$

represents the residue of an aldehyde selected from the group consisting of aryl aldehydes, aralkylene aldehydes, and aldehydes characterized by the presence of a 2-furyl group.

7. The process of destroying insects which comprises poisoning said insects with a compound represented by the formula:

$$R-\overset{H}{C}=N-\overset{H}{N}-\overset{\overset{S}{\|}}{C}-\overset{H}{N}-\langle\phantom{O}\rangle$$

in which the group of $$R-\overset{H}{C}=$$

represents the residue of an aldehyde selected from the group consisting of aryl aldehydes, aralkylene aldehydes, and aldehydes characterized by the presence of a 2-furyl group.

8. The process of destroying insects which comprises applying to hosts for said insects a compound represented by the formula:

$$R-\overset{H}{C}=N-\overset{H}{N}-\overset{\overset{S}{\|}}{C}-\overset{H}{N}-\langle\phantom{O}\rangle$$

in which the group of $$R-\overset{H}{C}=$$

represents the residue of an aldehyde selected from the group consisting of aryl aldehydes, aralkylene aldehydes, and aldehydes characterized by the presence of a 2-furyl group.

9. The process of destroying insects which comprises applying benzaldehyde 4-phenyl-3-thiosemicarbazone to hosts for said insects.

10. The process of destroying insects which comprises applying salicylaldehyde 4-phenyl-3-thiosemicarbazone to hosts for said insects.

11. The process of destroying insects which comprises applying cinnamaldehyde 4-phenyl-3-thiosemicarbazone to hosts for said insects.

CHARLES VERNE BOWEN.